(12) United States Patent
Henn et al.

(10) Patent No.: US 12,365,245 B1
(45) Date of Patent: Jul. 22, 2025

(54) LEVEL SENSING FILL WITHOUT A SIGHT GAUGE

(71) Applicant: Deere & Company, Moline, IL (US)

(72) Inventors: Grant R. Henn, Dubuque, IA (US);
Steven K. Cureton, Dubuque, IA (US);
Jason Bennett, Dubuque, IA (US);
Brett S. Graham, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/672,088

(22) Filed: May 23, 2024

(51) Int. Cl.
*B60K 35/22* (2024.01)
*B60K 35/80* (2024.01)

(52) U.S. Cl.
CPC .............. *B60K 35/22* (2024.01); *B60K 35/80* (2024.01); *B60K 2360/178* (2024.01); *B60K 2360/566* (2024.01)

(58) Field of Classification Search
CPC .. B60K 35/22; B60K 35/80; B60K 2360/566; B60K 2360/17
USPC ......................................................... 184/6.4
See application file for complete search history.

(56) References Cited

U.S. PATENT DOCUMENTS

| | | | | |
|---|---|---|---|---|
| 5,177,521 A * | 1/1993 | Mogi | ...................... | G03D 3/065 396/626 |
| 6,711,949 B1 * | 3/2004 | Sorenson | ................ | G01F 23/38 73/317 |
| 8,126,840 B2 * | 2/2012 | Davis | ...................... | G06Q 10/06 718/101 |
| 8,360,343 B2 * | 1/2013 | Gudat | ....................... | E01H 3/02 239/69 |
| 9,463,483 B2 * | 10/2016 | Gudat | ....................... | E01H 3/02 |
| 10,347,058 B2 * | 7/2019 | Pursifull | ................ | G06Q 10/20 |
| 11,765,993 B2 * | 9/2023 | O'Connor | ............ | G01F 23/292 345/589 |
| 2004/0045623 A1 * | 3/2004 | Parker, III | ............. | G06Q 10/08 141/98 |
| 2004/0079152 A1 * | 4/2004 | Sorenson | ................ | G01F 23/38 702/45 |
| 2004/0089371 A1 * | 5/2004 | Few | ........................ | F01M 11/04 141/98 |
| 2004/0094227 A1 * | 5/2004 | Few | ........................ | F01M 11/04 141/98 |
| 2009/0043441 A1 * | 2/2009 | Breed | ..................... | G07C 5/085 701/31.9 |
| 2009/0106227 A1 * | 4/2009 | Davis | ..................... | G06Q 10/06 707/999.005 |
| 2011/0266360 A1 * | 11/2011 | Gudat | ..................... | B05B 13/00 239/11 |
| 2012/0150879 A1 * | 6/2012 | Davis | ..................... | G06Q 10/06 707/754 |
| 2013/0099017 A1 * | 4/2013 | Gudat | ....................... | E21F 5/02 239/1 |

(Continued)

FOREIGN PATENT DOCUMENTS

EP 2112481 A1 10/2009

*Primary Examiner* — Henry Y Liu

(57) ABSTRACT

A method for filling a fluid of a work vehicle. The method comprises activating a fill mode and selecting a fluid to be filled on a display, sensing a fluid fill level, comparing the fluid fill level to a target fill level, initiating a fill level alert when the fluid fill level approaches the target fill level, and deactivating the fill mode when the fluid fill level substantially equals the target fill level.

20 Claims, 7 Drawing Sheets

(56) References Cited

U.S. PATENT DOCUMENTS

| | | | |
|---|---|---|---|
| 2014/0229391 A1* | 8/2014 | East, III | G06Q 10/20 |
| | | | 705/305 |
| 2016/0042576 A1* | 2/2016 | Fischer | G07C 5/008 |
| | | | 701/29.4 |
| 2016/0097668 A1* | 4/2016 | Vilag | G01F 23/265 |
| | | | 73/304 C |
| 2017/0364869 A1* | 12/2017 | Tarte | G06Q 10/1095 |
| 2019/0164360 A1* | 5/2019 | Pursifull | G07C 5/008 |
| 2021/0187526 A1* | 6/2021 | Kundem | B05B 12/008 |

* cited by examiner

LEVEL SENSING FILL WITHOUT A SIGHT GAUGE

TECHNICAL FIELD

The present disclosure relates generally to a work vehicle with an implement and a fill mode for filling a fluid of the work vehicle.

BACKGROUND

Work vehicles have many fluids that need monitored and filled. It is important to fill the correct fluid to the correct level.

SUMMARY

A work vehicle is disclosed. The work vehicle comprises a frame supported by a plurality of ground-engaging units. The ground-engaging units are configured to support the frame on a surface. An engine is configured to provide motive power to the ground-engaging units to move the work vehicle. The engine comprises an engine oil. An implement is pivotally coupled to the frame. A hydraulic cylinder is coupled to the implement and the frame and is configured to move the implement. A hydraulic fluid reservoir is in fluid communication with the hydraulic cylinder. The hydraulic fluid reservoir comprises a hydraulic fluid. An engine oil sensor is positioned to measure an engine oil fill level. A hydraulic fluid sensor is positioned to measure a hydraulic fluid fill level. A display is configured to show the engine oil fill level and the hydraulic fluid fill level. A controller is communicatively coupled to the engine oil sensor and the hydraulic fluid sensor. The controller comprises a data storage device and an electronic data processor. The data storage device is configured for storing instructions that are executable by the electronic data processor to cause the electronic data processor to activate a fill mode upon the selection of a fluid comprising the engine oil or the hydraulic fluid to be filled on the display, receive signals indicative of the engine oil fill level and the hydraulic fluid fill level, compare the engine oil fill level to an engine oil target fill level, compare the hydraulic fluid fill level to a hydraulic fluid target fill level, initiate a fill error alert after sensing another fluid besides the selected fluid is being filled instead and preventing the engine of the work vehicle from starting or shutting down the engine, and initiate a fill completion alert when the engine oil fill level substantially equals the engine oil target fill level or the hydraulic fluid target fill level substantially equals the hydraulic fluid target fill level and deactivate the fill mode.

A method for filling a fluid of a work vehicle is disclosed. The method comprises activating a fill mode and selecting a fluid to be filled on a display, sensing a fluid fill level, comparing the fluid fill level to a target fill level, initiating a fill level alert when the fluid fill level approaches the target fill level, and deactivating the fill mode when the fluid fill level substantially equals the target fill level.

A method for filling a fluid of a work vehicle is disclosed. The method comprises activating a fill mode and selecting a fluid of a plurality of fluids to be filled on a display, sensing a fluid fill level, comparing the fluid fill level to a target fill level, initiating a fill error alert after sensing another fluid of the plurality of fluids is being filled instead of the fluid selected and preventing an engine of the work vehicle from starting or shutting down the engine, and initiating a fill completion alert when the fluid fill level substantially equals the target fill level and deactivating the fill mode.

Other features and aspects will become apparent by consideration of the detailed description, claims, and accompanying drawings.

BRIEF DESCRIPTION OF THE DRAWINGS

The detailed description of the drawings refers to the accompanying figures.

Like reference numerals are used to indicate like elements throughout the several figures.

DETAILED DESCRIPTION

Figure 1:
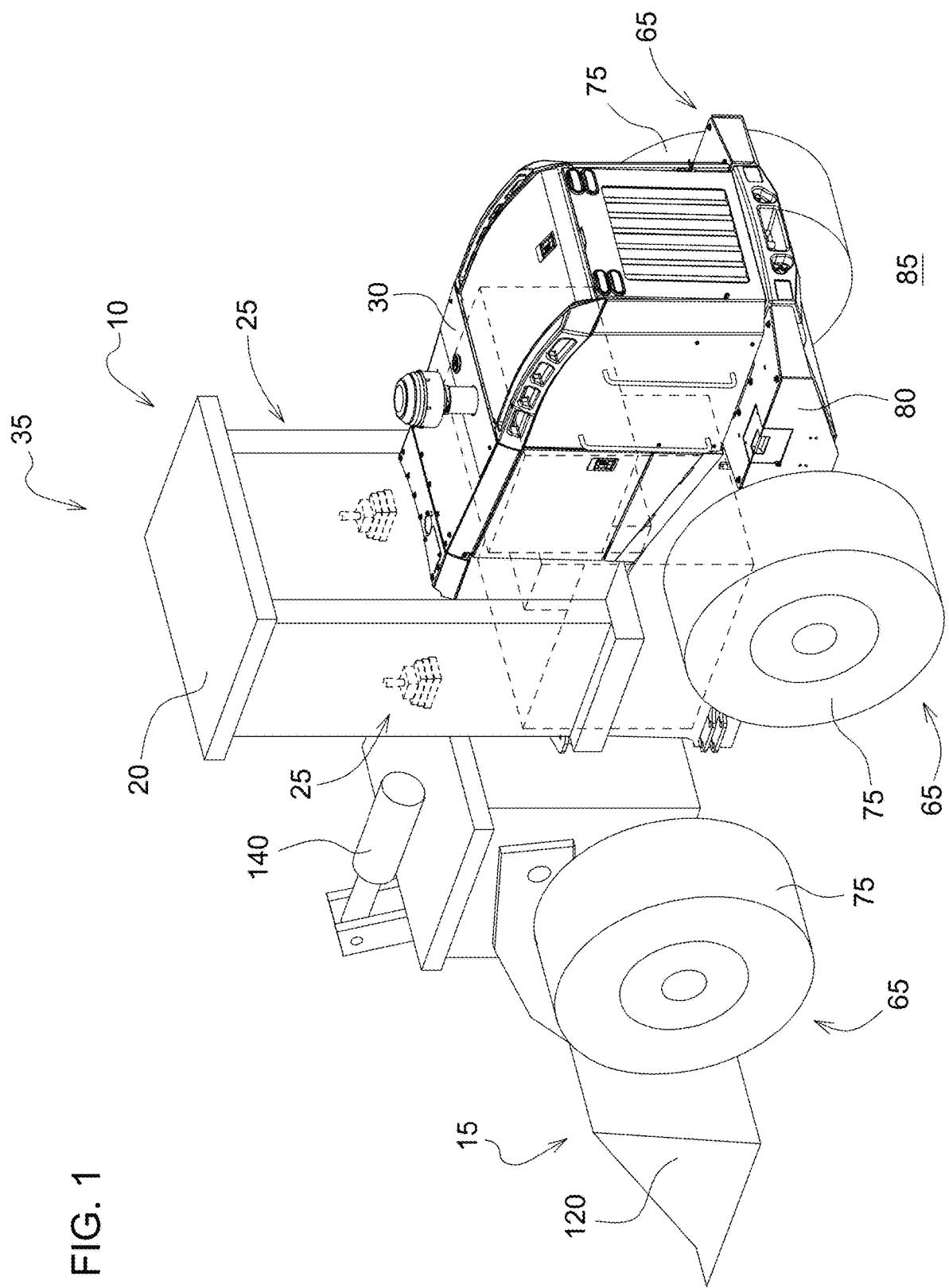
FIG. 1 is a perspective view of a work vehicle including an implement according to one embodiment.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

FIGS. 1-4 illustrate a work vehicle 10 having at least one implement 15, an operator station 20 having an operator interface 25, and an engine 30. The work vehicle 10 may be any work vehicle 10 to which the implement 15 may be coupled, such as a wheel loader 35 (FIG. 1), an articulated dump truck 40 ("ADT") (FIG. 2), a crawler 45 (FIG. 3), or a motor grader 50 (FIG. 4), to name a few examples.

The work vehicle 10 may be controlled by an operator located in the operator station 20 or by an operator located remote from the work vehicle 10. The operator interface 25 may comprise a monitor or display 55 such as a monitor in a cab or operator station 20 of the work vehicle 10, a phone 60, or a monitor remote from the work vehicle 10. Additionally, the operator interface 25 may be any personal communication device 190 including tablets, laptops, smart watches.

The operator may command the work vehicle 10 to move forward, move backward, and turn. Those commands may be sent to hydraulic pumps, driven by the engine 30, which direct pressurized hydraulic fluid 90 to hydraulic motors that turn the plurality of ground engaging units 65 such as tracks 70 or wheels 75. Alternatively, electric motors may turn the tracks 70 or wheels 75. The engine 30 may be a diesel engine. The engine 30 provides motive power to the ground engaging units 65. The ground engaging units 65 support a frame 80 of the work vehicle 10 on a surface 85.

Figure 3:
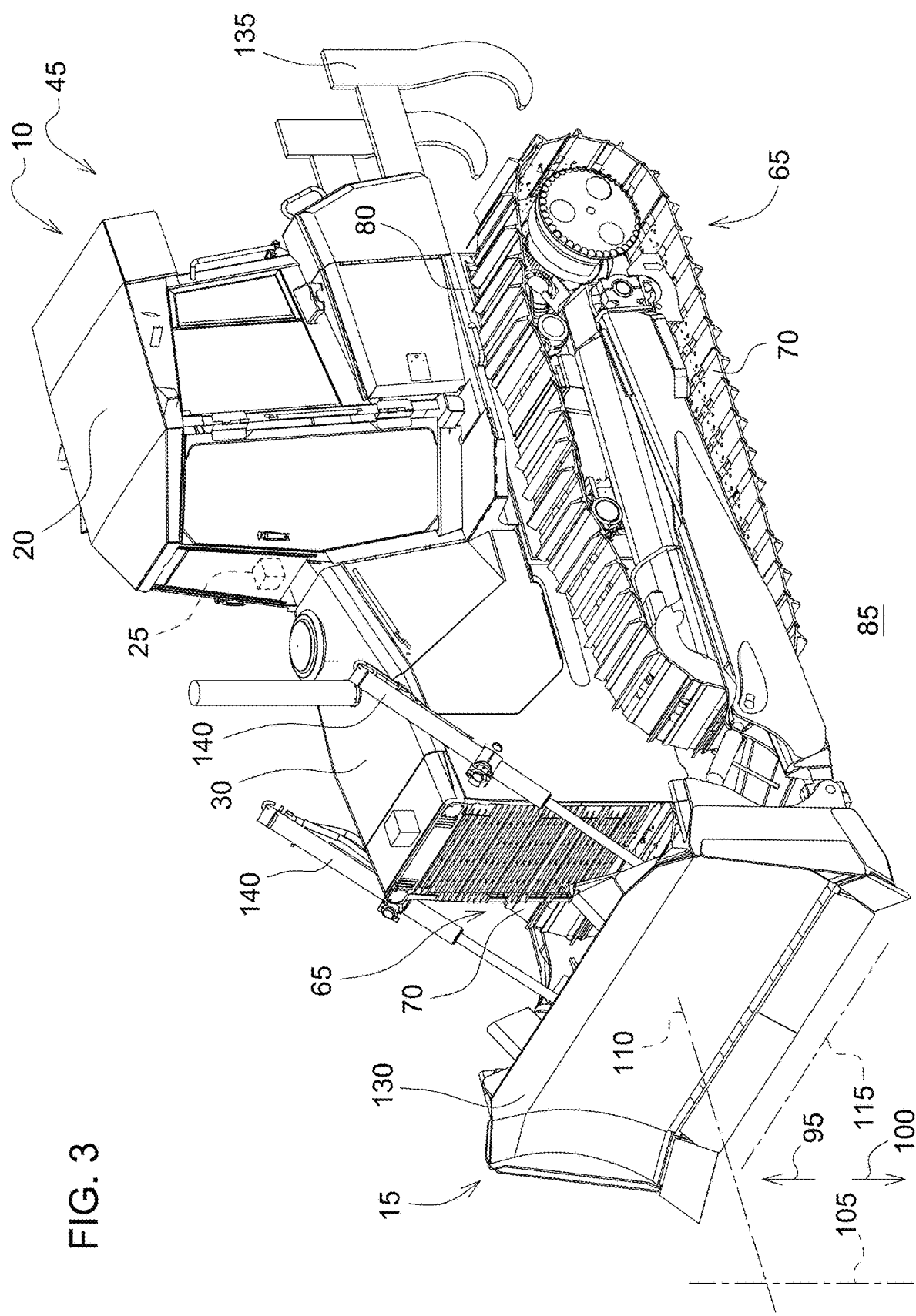
FIG. 3 is a perspective view of a work vehicle including an implement according to yet another embodiment.

The implement 15 may be positioned at a front of the work vehicle 10 and may be attached to the work vehicle 10 in a number of different manners. Alternatively, the implement 15 may be positioned near a center of the work vehicle 10 or at a rear of the work vehicle 10, such as shown on the motor grader 50. For example, the implement 15 may be coupled to the frame 80 via linkages. In the embodiment of FIG. 3, the implement 15 is attached to the work vehicle 10 through a linkage which includes a series of pinned joints, structural members, and hydraulic cylinders 140. This configuration allows the implement 15 to be moved up 95 and down 100 relative to the surface 85 or ground, rotate around a vertical axis 105 (i.e., an axis normal to the ground), rotate around a longitudinal axis 110 (e.g., a fore-aft axis of the work vehicle 10), and rotate around a lateral axis 115 of the work vehicle 10 (i.e., a left-right axis of the work vehicle 10). These degrees of freedom permit the implement 15 to engage the ground at multiple depths and cutting angles. Alternative embodiments may involve implements 15 with greater degrees of freedom, such as those found on some motor graders 50, and those with fewer degrees of freedom, such as "pushbeam" style blades found on some crawlers 45 and implements 15 which may only be raised, lowered, and rotated around a vertical axis as found on some excavators and skidders.

Figure 2:
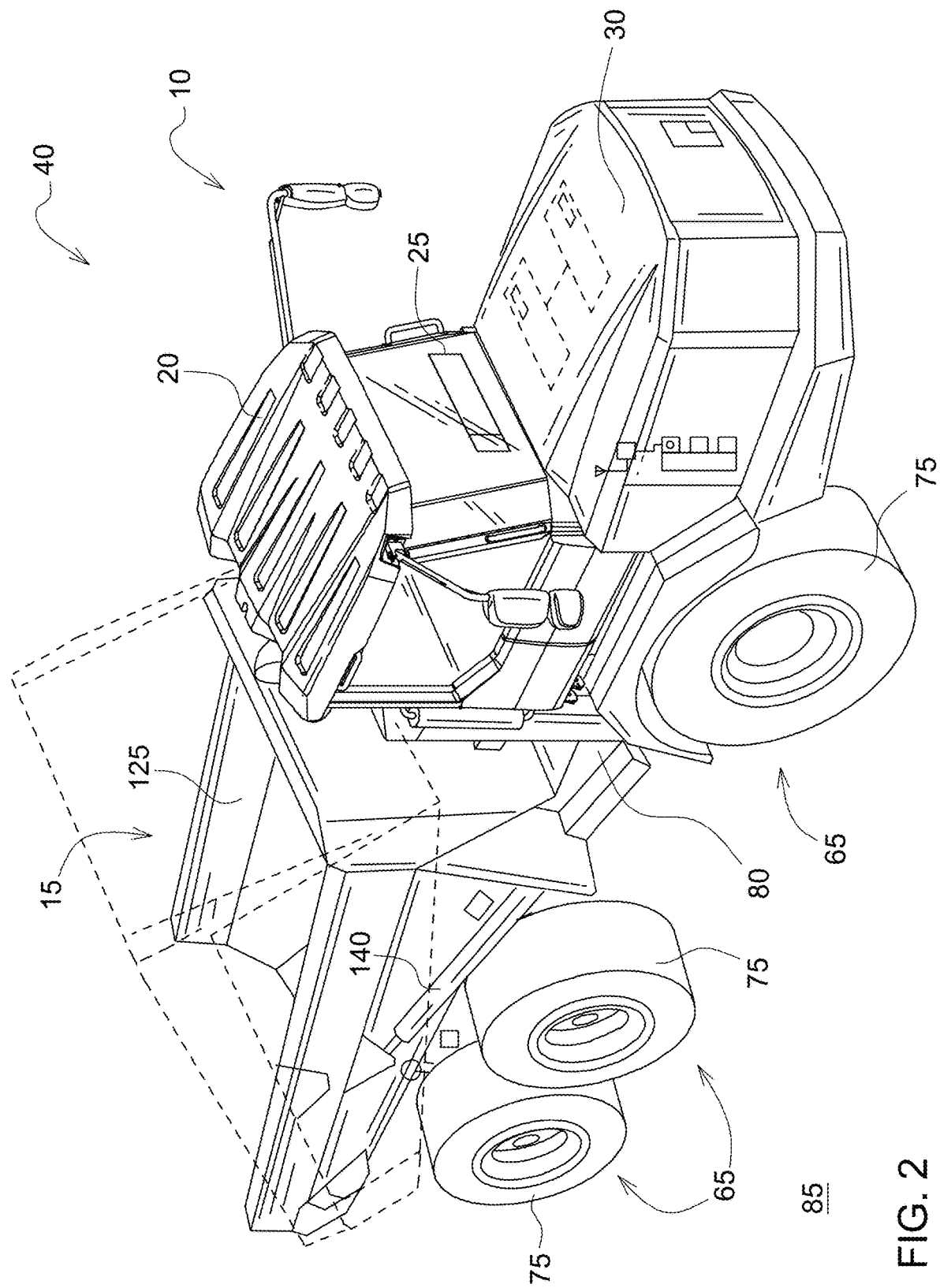
FIG. 2 is a perspective view of a work vehicle including an implement according to another embodiment.
Figure 4:
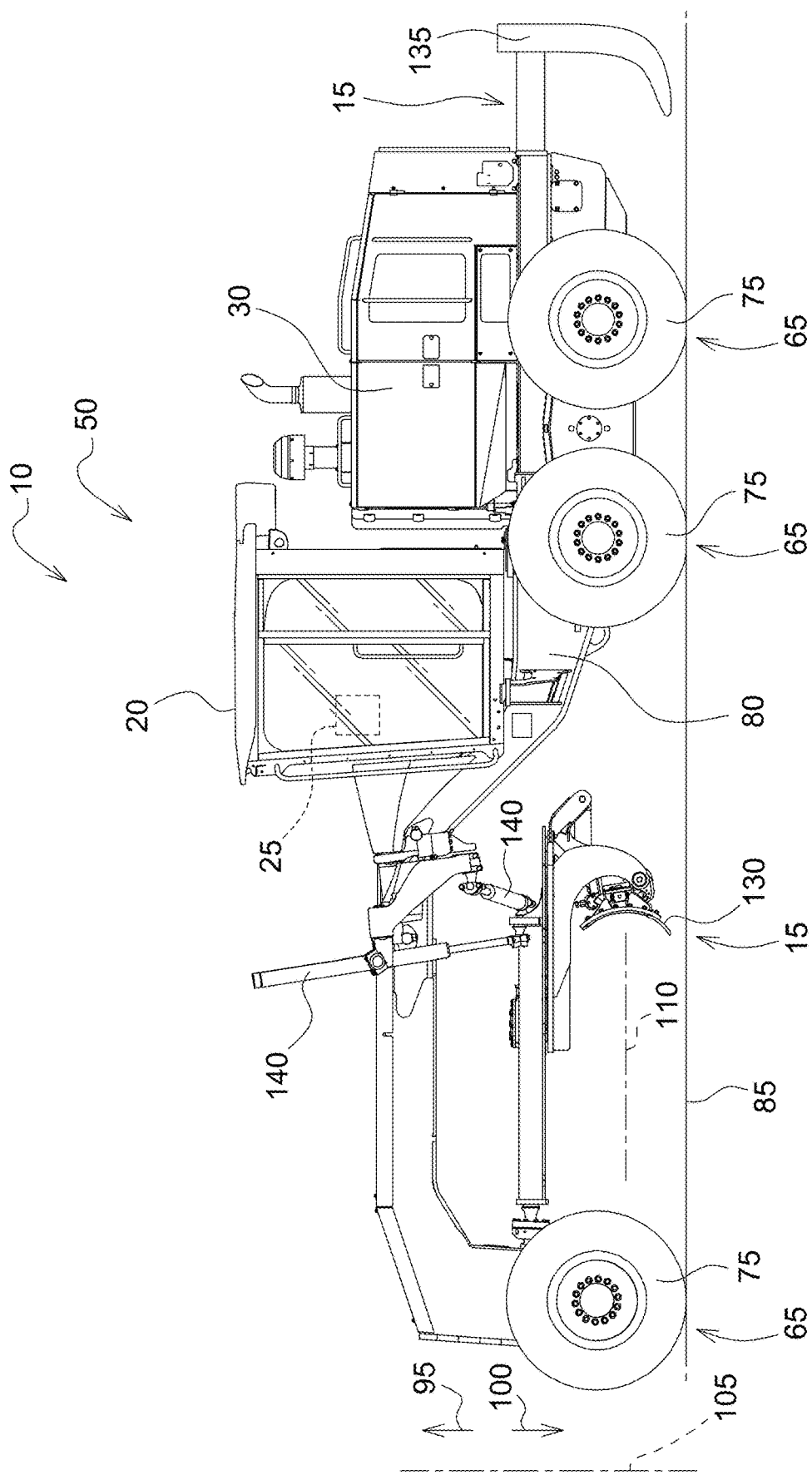
FIG. 4 is a perspective view of a work vehicle including an implement according to another embodiment.

In the embodiment of FIG. 1, the implement 15 comprises a bucket 120 for lifting and moving material. In the embodiment of FIG. 2, the implement 15 comprises a bin 125 for hauling material. In the embodiment of FIG. 3, the implement 15 comprises a blade 130 for pushing material. In the embodiment of FIG. 4, the implement 15 comprises the blade 130 and a ripper 135 for pushing and moving material. Other implements 15 for use with work vehicles 10 are contemplated by this disclosure.

The operator may command movement of the implement 15 from the operator station 20, which may be coupled to the work vehicle 10 or located remotely. In the case of the work vehicle 10, those commands are sent, including mechanically, hydraulically, and/or electrically, to a hydraulic control valve. The hydraulic control valve receives pressurized hydraulic fluid 90 from a hydraulic pump, and selectively sends such pressurized hydraulic fluid to a system of hydraulic cylinders 140 based on the operator's commands. The hydraulic cylinders 140, which in this case are double-acting, in the system are extended or retracted by the pressurized hydraulic fluid 140 and thereby actuate the implement 15. Alternatively, electronic actuators may be used. The hydraulic cylinders 140 may be coupled to the implement 15 and the frame 80. A hydraulic fluid reservoir 145 is in fluid communication with the hydraulic cylinders 140. Hydraulic fluid 140 is contained in the hydraulic fluid reservoir 145.

Figure 5:
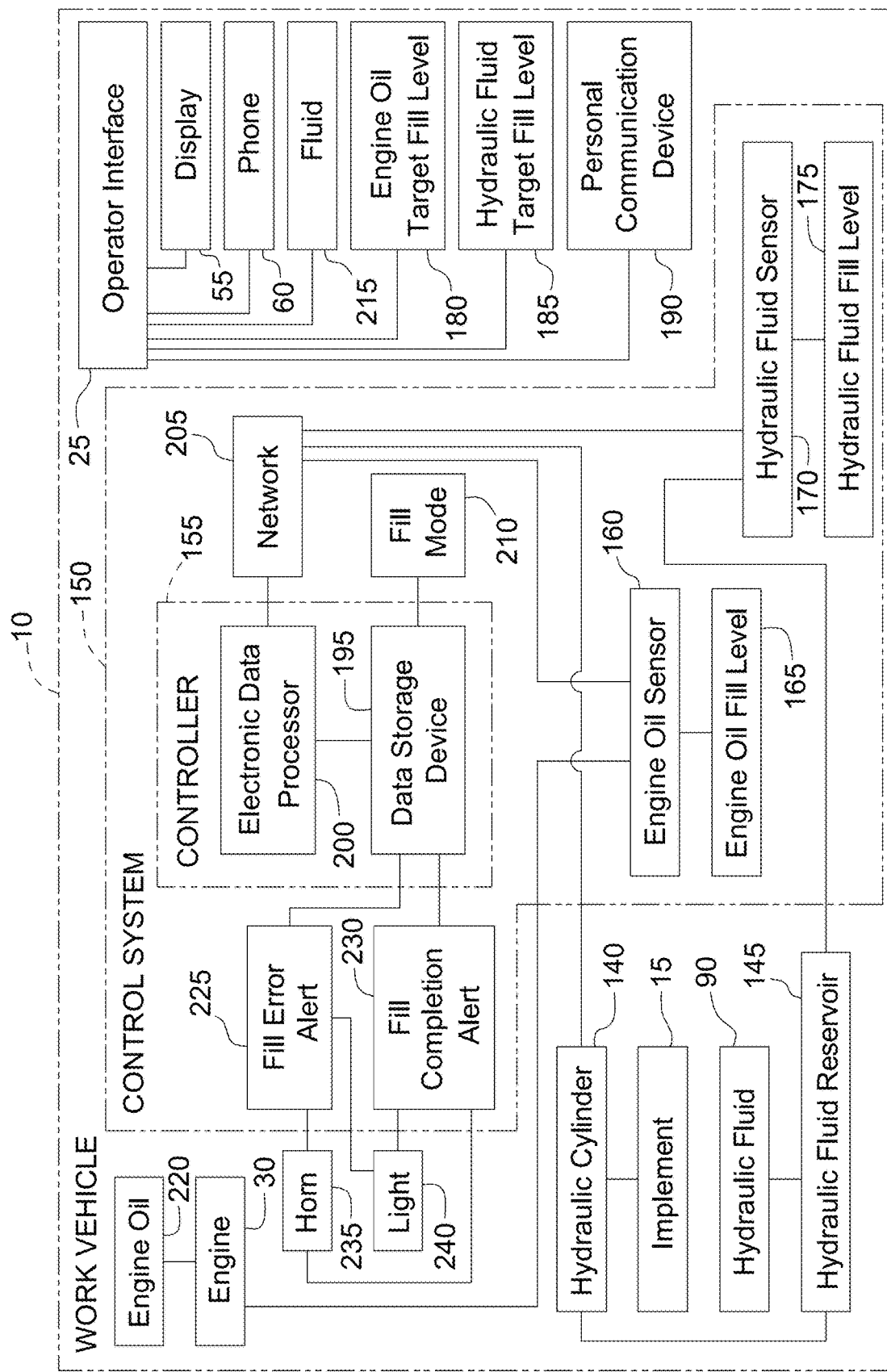
FIG. 5 is a schematic of a work vehicle with an implement.

With reference to FIG. 5, the work vehicle 10 has a control system 150. The control system 150 comprises a controller 155, an engine oil sensor 160 positioned to measure an engine oil fill level 165 of the engine 30, and a hydraulic fluid sensor 170 positioned to measure a hydraulic fluid fill level 175 of the hydraulic fluid reservoir 145. The operator interface 25 may comprise the display 55 configured to show the engine oil fill level 165 and the hydraulic fluid fill level 175 and the amount needed to reach an engine oil target fill level 180 and a hydraulic fluid target fill level 185. Alternatively, the operator interface 25 may comprise a phone 60, or a monitor or display 55 remote from the work vehicle 10 to show the engine oil fill level 165 and the hydraulic fluid fill level 175 and the amount needed to reach an engine oil target fill level 180 and a hydraulic fluid target fill level 185. The operator interface 25 may show other fill levels and targets as well.

Although the controller 155 is referenced in the singular, in alternative embodiments the configuration and functionality described herein can be split across multiple devices using techniques known to a person of ordinary skill in the art. The controller 155 includes a data storage device 195 that includes the tangible, non-transitory memory on which are recorded computer-executable instructions. The controller 155 may be embodied as one or multiple digital computers or host machines each having one or more electronic data processors 200, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics. As used herein, "controller" is intended to be used consistent with how the term is used by a person of skill in the art, and refers to a computing component with processing, memory, and communication capabilities, which is utilized to execute instructions (i.e., stored on the memory or received via the communication capabilities) to control or communicate with one or more other components. In certain embodiments, the controller 155 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 155 is provided and configured to perform an operation by turning the engine 30 off or controllably adjusting a position of the implement 15 relative to the work vehicle 10. The controller 155 may be arranged locally as part of the work vehicle 10 or remotely at a remote processing center (not shown). In various embodiments, the electronic data processor 200 of the controller 155 may comprise a microprocessor, a microcontroller, a central processing unit, a programmable logic array, a programmable logic controller, other suitable programmable circuitry that is adapted to perform data processing and/or system control operations.

In one embodiment, the controller 155 is communicatively coupled to the engine oil sensor 160 and the hydraulic fluid sensor 170 via a wired or a wireless network 205. The controller 155 comprises the data storage device 195 and the electronic data processor 200. The data storage device 195 is configured for storing instructions that are executable by the electronic data processor 200 to cause the electronic data processor 200 to activate a fill mode 210 upon the selection of a fluid 215, comprising an engine oil 220 housed in the engine 30 or the hydraulic fluid 90 housed in the hydraulic fluid reservoir 145, to be filled on the display 55. Other fluids 215 are contemplated by this disclosure including transmission fluid, windshield wiper fluid, diesel, gasoline, diesel exhaust fluid, and power steering fluid, as examples.

The electronic data processor 200 is configured to receive signals indicative of the engine oil fill level 165 and the hydraulic fluid fill level 175. Using the signals, the electronic data processor 200 is configured to compare the engine oil fill level 165 to an engine oil target fill level 180. Using the signals, the electronic data processor 200 is also configured to compare the hydraulic fluid fill level 175 to a hydraulic fluid target fill level 185. The electronic data processor 200 is configured to initiate a fill error alert 225 after receiving a signal that indicates that the wrong fluid 215 is being filled to prevent the engine 30 of the work vehicle 10 from starting or shut down the engine 30. Alternatively, the electronic data processor 200 could prevent the hydraulic cylinders 140 from being used.

The electronic data processor 200 is also configured to initiate a fill completion alert 230 when the engine oil fill level 165 substantially equals the engine oil target fill level 180 or the hydraulic fluid fill level 175 substantially equals the hydraulic fluid target fill level 185 and deactivate the fill mode 210. In one embodiment, substantially may mean 90-99% full. Other ranges are contemplated by this disclosure depending on the fluid 215 being filled.

The fill error alert 225 and the fill completion alert 230 may comprise a horn 235 honking or a light 240 flashing. Alternatively, the fill completion alert 230 may comprise the horn 235 honking at a changing frequency as the fill nears completion. For example, the horn 235 may honk less frequently and then progressively more frequently as the fill nears completion. Or the horn 235 may honk more frequently and then progressively less frequently as the fill nears completion. The fill completion alert 230 may comprise the light 240 flashing at a changing frequency as the fill nears completion. For example, the light 240 may flash slow and then progressively faster as the fill nears completion. Or the light 240 may flash fast and then progressively slower as the fill nears completion.

Figure 6:
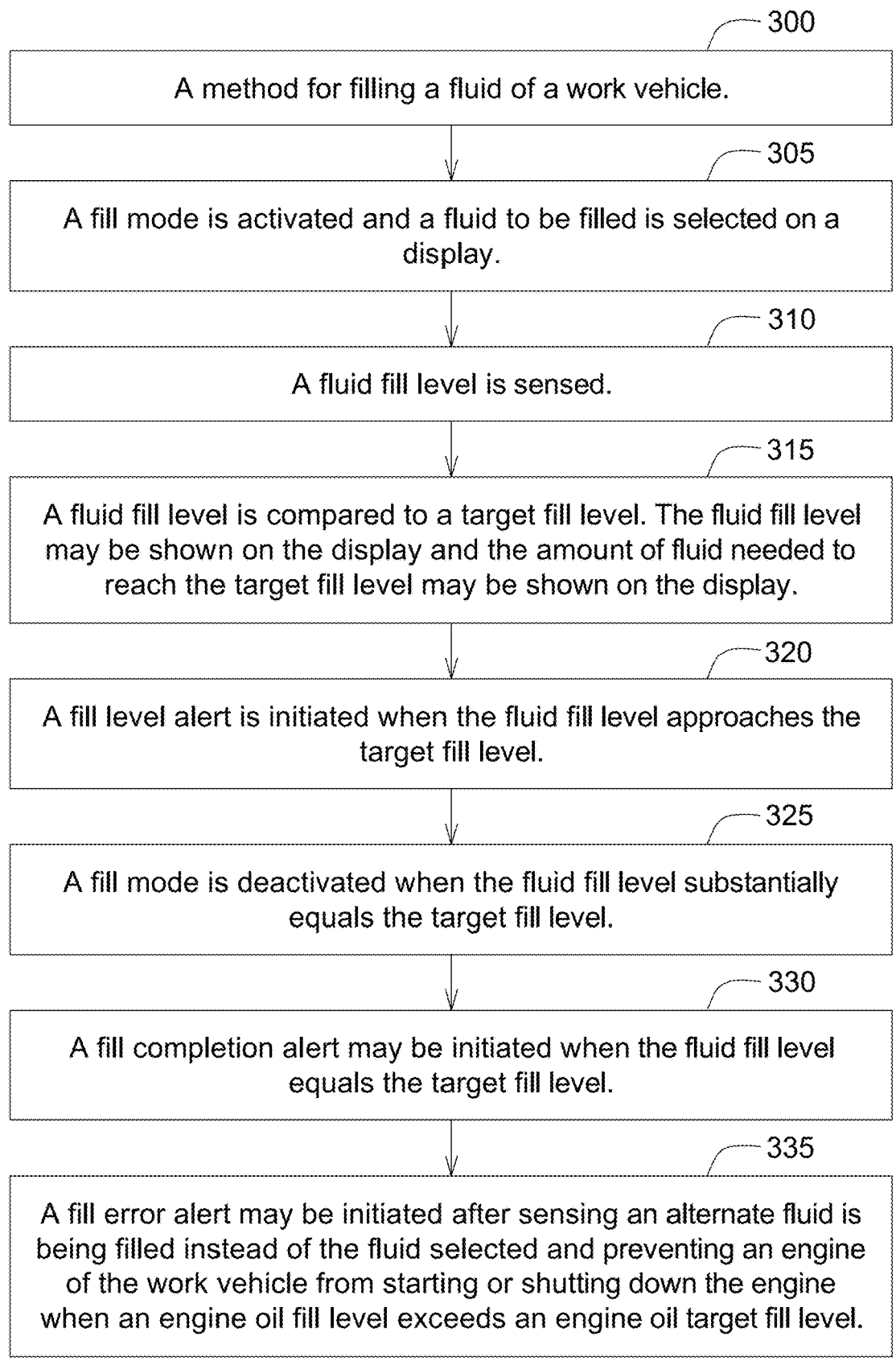
FIG. 6 is a flow chart of a method for filling a fluid of a work vehicle.

Referring now to FIG. 6, a flow chart of a method 300 for filling a fluid 215 of a work vehicle 10 is shown. At 305, a fill mode 210 is activated and a fluid 215 to be filled is selected on a display 55. At 310, a fluid fill level is sensed. At 315, the fluid fill level is compared to a target fill level. The fluid fill level may be shown on the display and the amount of fluid needed to reach the target fill level may be shown on the display. At 320, a fill level alert is initiated when the fluid fill level approaches the target fill level. At 325, the fill mode is deactivated when the fluid fill level substantially equals the target fill level. At 330, a fill completion alert may be initiated when the fluid fill level equals the target fill level. At 335, a fill error alert may be initiated after sensing an alternate fluid is being filled instead of the fluid selected and preventing an engine of the work vehicle from starting or shutting down the engine when an engine oil fill level exceeds an engine oil target fill level.

Figure 7:
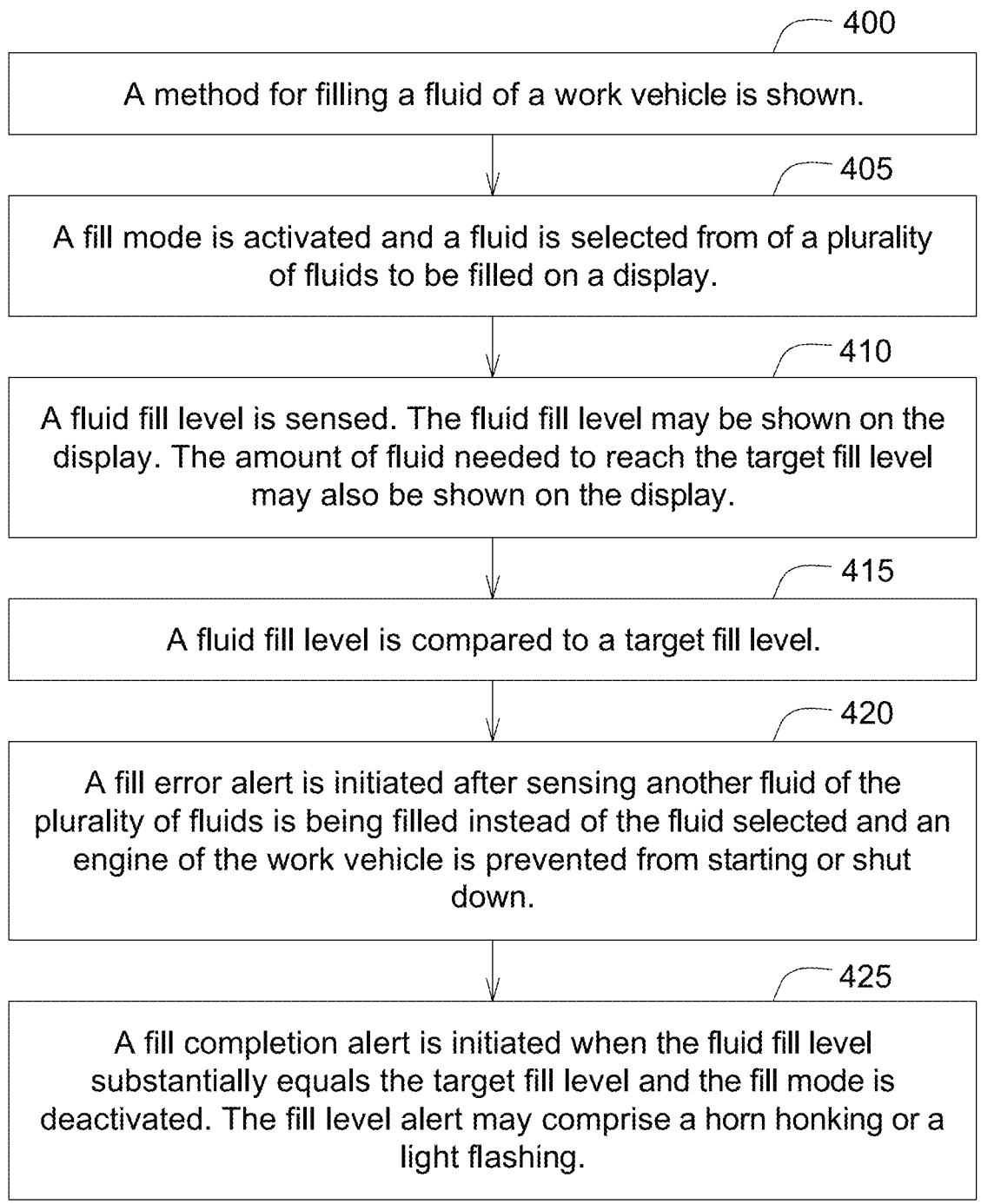
FIG. 7 is a flow chart of an alternative method for filling a fluid of a work vehicle.

With reference to FIG. 7, a flow chart of an alternative method 400 for filling a fluid 215 of a work vehicle 10 is shown. At 405, a fill mode is activated and a fluid is selected from of a plurality of fluids to be filled on a display. At 410, a fluid fill level is sensed. The fluid fill level may be shown on the display. The amount of fluid needed to reach the target fill level may also be shown on the display. At 415, the fluid fill level is compared to a target fill level. At 420, a fill error alert is initiated after sensing another fluid of the plurality of fluids is being filled instead of the fluid selected and an engine of the work vehicle is prevented from starting or shut down. At 425, a fill completion alert is initiated when the fluid fill level substantially equals the target fill level and the fill mode is deactivated. The fill level alert may comprise a horn honking or a light flashing.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A method for filling a fluid of a work vehicle, the method comprising:
   activating a fill mode and selecting a fluid to be filled on a display;
   sensing a fluid fill level;
   comparing the fluid fill level to a target fill level;
   initiating a fill level alert when the fluid fill level approaches the target fill level; and
   deactivating the fill mode when the fluid fill level substantially equals the target fill level.

2. The method of claim 1, further comprising initiating a fill completion alert when the fluid fill level equals the target fill level.

3. The method of claim 1, wherein the display comprises a monitor in a cab of the work vehicle, a phone, or a monitor remote from the work vehicle.

4. The method of claim 1, further comprising initiating a fill error alert after sensing an alternate fluid is being filled instead of the fluid selected and preventing an engine of the work vehicle from starting or shutting down the engine when an engine oil fill level exceeds an engine oil target fill level.

5. The method of claim 1, further comprising displaying the fluid fill level on the display.

6. The method of claim 1, wherein the fill level alert comprises a horn honking or a light flashing.

7. The method of claim 1, further comprising displaying the fluid fill level on the display and the amount of fluid needed to reach the target fill level.

8. A method for filling a fluid of a work vehicle, the method comprising:
   activating a fill mode and selecting a fluid of a plurality of fluids to be filled on a display;
   sensing a fluid fill level;
   comparing the fluid fill level to a target fill level;
   initiating a fill error alert after sensing another fluid of the plurality of fluids is being filled instead of the fluid selected and preventing an engine of the work vehicle from starting or shutting down the engine; and
   initiating a fill completion alert when the fluid fill level substantially equals the target fill level and deactivating the fill mode.

9. The method of claim 8, wherein the display comprises a monitor in a cab of the work vehicle, a phone, or a monitor remote from the work vehicle.

10. The method of claim 8, further comprising displaying the fluid fill level on the display.

11. The method of claim 8, wherein the fill level alert comprises a horn honking or a light flashing.

12. The method of claim 8, further comprising displaying the fluid fill level on the display and the amount of fluid needed to reach the target fill level.

13. A work vehicle comprising:
- a frame supported by a plurality of ground-engaging units, the ground-engaging units configured to support the frame on a surface;
- an engine configured to provide motive power to the ground-engaging units to move the work vehicle, the engine comprising an engine oil;
- an implement pivotally coupled to the frame;
- a hydraulic cylinder coupled to the implement and the frame and configured to move the implement;
- a hydraulic fluid reservoir in fluid communication with the hydraulic cylinder, the hydraulic fluid reservoir comprising a hydraulic fluid;
- an engine oil sensor positioned to measure an engine oil fill level;
- a hydraulic fluid sensor positioned to measure a hydraulic fluid fill level;
- a display configured to show the engine oil fill level and the hydraulic fluid fill level; and
- a controller communicatively coupled to the engine oil sensor and the hydraulic fluid sensor, the controller comprising a data storage device and an electronic data processor, the data storage device configured for storing instructions that are executable by the electronic data processor to cause the electronic data processor to:
  - activate a fill mode upon the selection of a fluid comprising the engine oil or the hydraulic fluid to be filled on the display;
  - receive signals indicative of the engine oil fill level and the hydraulic fluid fill level;
  - compare the engine oil fill level to an engine oil target fill level;
  - compare the hydraulic fluid fill level to a hydraulic fluid target fill level;
  - initiate a fill error alert after sensing another fluid besides the selected fluid is being filled instead and preventing the engine of the work vehicle from starting or shutting down the engine; and
  - initiate a fill completion alert when the engine oil fill level substantially equals the engine oil target fill level or the hydraulic fluid fill level substantially equals the hydraulic fluid target fill level and deactivate the fill mode.

14. The work vehicle of claim 13, wherein the implement comprises one of a bin, a boom comprising a bucket, or a blade.

15. The work vehicle of claim 13, wherein the display comprises a monitor in a cab of the work vehicle, a phone, or a monitor remote from the work vehicle.

16. The work vehicle of claim 13, further comprising displaying the engine oil fill level or the hydraulic fluid fill level on the display.

17. The work vehicle of claim 13, wherein the fill error alert or the fill completion alert comprises a horn honking or a light flashing.

18. The work vehicle of claim 13, further comprising displaying the engine oil fill level or the hydraulic fluid fill level on the display and the amount needed to reach the engine oil target fill level or the hydraulic fluid target fill level.

19. The work vehicle of claim 13, wherein work vehicle comprises an articulated dump truck, a motor grader, a crawler, or a wheel loader.

20. The work vehicle of claim 13, wherein the fill error alert or the fill completion alert comprises a horn honking or a light flashing.

* * * * *